No. 666,610. Patented Jan. 22, 1901.
W. C. SLOAN.
INTERCHANGEABLE RUNNING GEAR FOR VEHICLES.
(Application filed Apr. 12, 1900.)
(No Model.) 2 Sheets—Sheet 1.
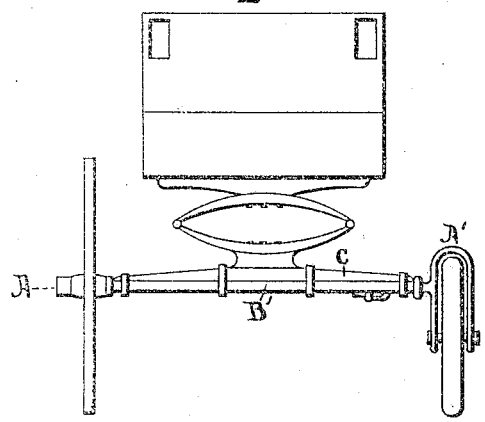
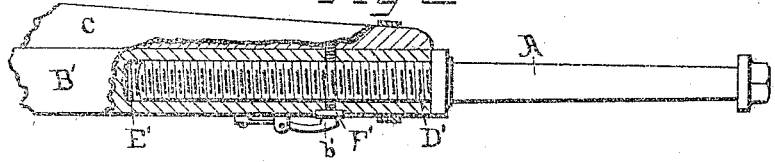
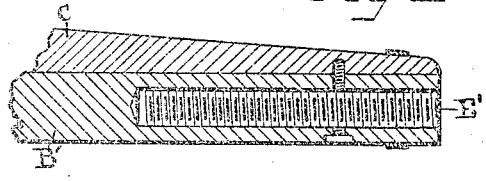
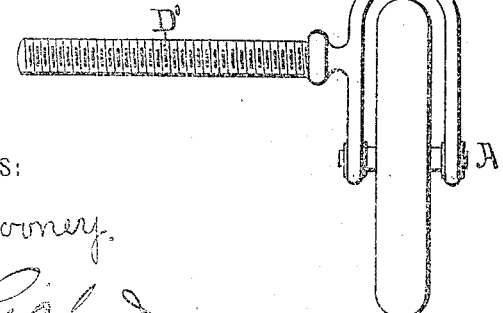
WITNESSES:
INVENTOR
William C. Sloan
BY
Chas. H. Davids
ATTORNEY.

No. 666,610. Patented Jan. 22, 1901.
W. C. SLOAN.
INTERCHANGEABLE RUNNING GEAR FOR VEHICLES.
(Application filed Apr. 12, 1900.)
(No Model.) 2 Sheets—Sheet 2.
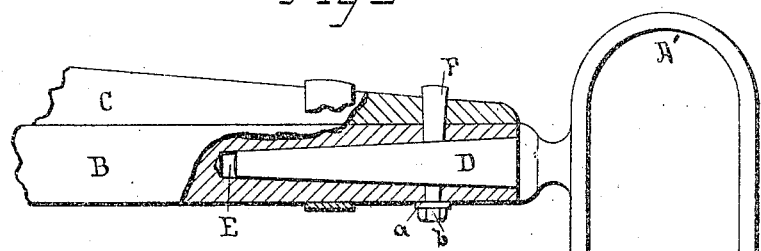
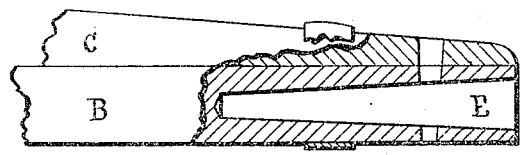
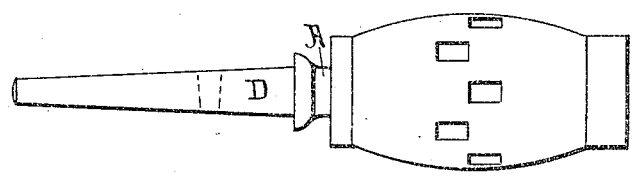
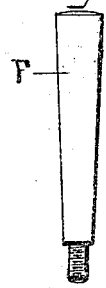 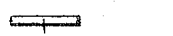 
WITNESSES:
A. Cooney.
INVENTOR
William C. Sloan,
BY
Chas. H. Davids,
ATTORNEY

UNITED STATES PATENT OFFICE.

WILLIAM CLEMENT SLOAN, OF CAMDEN, NEW JERSEY.

INTERCHANGEABLE RUNNING-GEAR FOR VEHICLES.

SPECIFICATION forming part of Letters Patent No. 666,610, dated January 22, 1901.

Application filed April 12, 1900. Serial No. 12,652. (No model.)

*To all whom it may concern:*

Be it known that I, WILLIAM CLEMENT SLOAN, a citizen of the United States, and a resident of Camden, in the county of Camden and State of New Jersey, have invented certain new and useful Improvements in Interchangeable Running-Gear for Wheeled Vehicles, of which the following is a specification.

The object of my invention is to provide means whereby wheeled vehicles may be readily adapted for use on various road-surfaces, the device herein shown and described permitting a ready change of running-gear to be made from one form to another—for instance, from that form in which the wheels have wooden spokes and metallic tires to that in which they have wire spokes and pneumatic tires, or vice versa, as may be required from time to time.

In the drawings, Figure 1 is a front elevation of a road-wagon with two forms of running-gear. Fig. 2 is a front view, partly in section, of one form of the invention; and Fig. 3 is a longitudinal section of an axletree and axle-bed appertaining thereto. Fig. 4 is a front elevation of a pneumatic wheel and connections adapting it for use in the form of the invention shown in Figs. 1, 2, and 3. Fig. 5 is a front view, partly in section, of a different form of the invention shown as adapted for use with a pneumatic-tired wheel; and Fig. 6, a longitudinal view, partly in section, of an axletree and axle-bed appertaining thereto. Fig. 7 is a view of a wagon-hub mounted on an axle and adapted for use in connection with the form of the invention shown in Figs. 5 and 6, and Figs. 8, 9, and 10 are respectively a cotter, washer, and nut, the uses thereof being hereinafter set forth.

In the most approved form of my invention, as shown in Figs. 5, 6, 7, 8, 9, and 10, an axle A is rigidly attached to a shank D, either directly, as in Fig. 7, or by means of a yoke or fork A', as in Fig. 5. The shank D, which is conical in form, is inserted in a socket formed longitudinally in the end of an axletree B. A cotter F passes transversely through both the axletree B and shank D, both of which have been slotted to receive it, and is held in place by a nut $b$ and washer $a$ on its screw-threaded shank, thus preventing both longitudinal and rotatory motion of the shank D in the axletree B.

In the modification of my invention shown in Figs. 2, 3, and 4 a screw-threaded axle-shank D' is screwed into an axletree B', suitably prepared to receive it, endwise in a longitudinal socket, and both longitudinal and rotatory motion of the shank D' in the axletree B' is prevented by a cross-screw F' passing transversely through both. A spring-operated detent $b'$ engages in the nick in the head of the cross-screw F', preventing the latter from unscrewing and backing out of position after insertion in place, as described.

In using my invention in the form first described the nut $b$ and washer $a$ being removed from the screw-threaded shank of the cotter F the latter is withdrawn from the axletree B and axle-shank D, the latter, with the axle A and any part of the running-gear pivoted thereon, being then easily detached from the vehicle. Should the invention be in use in the other form thereof shown and described herein, the above-mentioned result is attained by raising the spring-operated detent $b'$ from the nick in the head of the cross-screw F' and withdrawing the latter by unscrewing it, after which the axle-shank D' is withdrawn from the axletree B' by unscrewing it therefrom.

It is obvious that a reversal of the above operations will serve to attach and securely fasten to vehicles wheels of any desired form or design if provided with axle-shanks D or D', as shown, adapted for insertion, respectively, in the sockets in the axletrees B or B'.

I claim as new and as my invention—

A wheel-axle mounted in a forked bracket, a shank rigidly attached to said bracket and removably fixed in a socket formed longitudinally in the end of an axletree, substantially as herein shown and described and for the purpose set forth.

Signed at Camden, in the county of Camden and State of New Jersey, this 10th day of April, A. D. 1900.

WILLIAM CLEMENT SLOAN.

Witnesses:
WM. F. WALZ,
LOUIS LANGENFELD.